(12) United States Patent
Jun et al.

(10) Patent No.: US 12,500,513 B2
(45) Date of Patent: Dec. 16, 2025

(54) APPARATUS FOR ENABLING AN INVERTER TO SWITCH BETWEEN MODES AND A METHOD OF CONTROLLING SAME

(71) Applicant: HYUNDAI AUTOEVER CORP., Seoul (KR)

(72) Inventors: Eun-Su Jun, Seoul (KR); Dong-Hwi Lim, Yongin-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 417 days.

(21) Appl. No.: 18/075,006

(22) Filed: Dec. 5, 2022

(65) Prior Publication Data
US 2023/0179086 A1 Jun. 8, 2023

(30) Foreign Application Priority Data
Dec. 7, 2021 (KR) .................. 10-2021-0173484

(51) Int. Cl.
*H02M 1/00* (2007.01)
*H02M 1/38* (2007.01)
(Continued)

(52) U.S. Cl.
CPC ......... *H02M 1/385* (2021.05); *H02M 1/0077* (2021.05); *H02M 1/38* (2013.01);
(Continued)

(58) Field of Classification Search
CPC ...... H02P 25/184; H02P 25/186; H02P 25/22; H02P 29/028; H02P 29/68; H02P 27/06; H02P 27/08; H02P 27/085; H02P 2209/03; H02P 6/17; H02M 7/42; H02M 7/48; H02M 7/4807; H02M 7/53; H02M 7/537; H02M 7/5387; H02M 7/53871; H02M 7/53873; H02M 7/5395; B62D 5/0424; B60L 15/08; B60L 50/51; G01R 19/16538
See application file for complete search history.

(56) References Cited

U.S. PATENT DOCUMENTS

2011/0181219 A1\* 7/2011 Liegeois .................. H02P 29/02
318/400.29
2013/0271056 A1\* 10/2013 Bunte ...................... H02P 29/02
318/503
(Continued)

FOREIGN PATENT DOCUMENTS

CN 109104083 B \* 8/2020 ............... B60K 6/46
KR 101423054 B1 7/2014

*Primary Examiner* — Thienvu V Tran
*Assistant Examiner* — Shahzeb K Ahmad
(74) *Attorney, Agent, or Firm* — Lempia Summerfield Katz LLC (57) ABSTRACT

An apparatus for enabling an inverter to switch between modes includes: a first inverter unit; a second inverter unit; a load connected between the first inverter unit and the second inverter unit; a mode switching unit connected between the load and the second inverter unit; and a control unit configured to drive the load in a one-stage inverter mode or a two-stage inverter mode by performing control that turns on or off the mode switching unit. In particular, when an inverter switches between modes, the control unit performs mode switching in accordance with correct mode switching timing synchronization for PWM signal output.

19 Claims, 7 Drawing Sheets (51) Int. Cl.
*H02M 7/493* (2007.01)
*H02M 7/5387* (2007.01)
*H02M 7/483* (2007.01)

(52) U.S. Cl.
CPC ......... *H02M 7/493* (2013.01); *H02M 7/5387* (2013.01); *H02M 7/483* (2013.01)

(56) References Cited

U.S. PATENT DOCUMENTS

| | | | |
|---|---|---|---|
| 2015/0061567 A1* | 3/2015 | Gorka | H02P 25/22 |
| | | | 323/282 |
| 2020/0059189 A1* | 2/2020 | Ohashi | H02P 27/06 |
| 2021/0167702 A1* | 6/2021 | Saha | H02P 25/16 |
| 2021/0257953 A1* | 8/2021 | Kashiwazaki | H02P 27/06 |
| 2021/0384863 A1* | 12/2021 | Omata | H02P 25/22 |

* cited by examiner

APPARATUS FOR ENABLING AN INVERTER TO SWITCH BETWEEN MODES AND A METHOD OF CONTROLLING SAME

CROSS-REFERENCE TO RELATED APPLICATION

This application claims priority to and the benefit of Korean Patent Application No. 10-2021-0173484, filed on Dec. 7, 2021, the entire contents of which are incorporated herein by reference.

FIELD

The present disclosure relates to an apparatus for enabling an inverter to switch between modes and a method of controlling the apparatus.

BACKGROUND

The statements in this section merely provide background information related to the present disclosure and may not constitute prior art.

Unlike an ordinary three-phrase motor inside which voltage sources are connected using a Y-connection or Δ-connection configuration, an open-end winding machine has a structure in which three lines for the voltage sources can be connected outside the open-end winding machine instead of being connected inside the open-end winding machine.

Usually, the open-end winding machine is driven using two inverters. In this case, a voltage that is to be applied to the open-end winding machine can be increased because the voltage can be output from both sides. In addition, because the voltage that is to be applied to the open-end winding machine is increased, the same effect as in a maximum 4-level inverter can be obtained.

When the open-end winding machine is driven using a two-stage inverter, a power source is usually connected to each of the two inverters and electric power is supplied to the open-end winding machine. However, the power source is connected only to one inverter, and the other inverter is separated from the power source. Thus, a regardless of the power source, a DC link voltage on the side of the separated inverter may be increased as desired and may be used. In this case, the separated inverter cannot continuously output effective electric power nor receive it. For this reason, the separated inverter can serve as an ineffective electric power source.

In recent years, research has been ongoing as to switching of s two-stage inverter between modes to ensure high output and high efficiency in a capacity-limited battery for next-generation electric vehicles. However, a short circuit may occur when performing mode switching.

SUMMARY

An object of the present disclosure, which is contrived to solve the above-mentioned problem, is to provide an apparatus for enabling an inverter to switch between modes and a method of controlling the apparatus. The apparatus and the method are capable of enhancing the safety when a two-stage inverter switches between modes.

According to an aspect of the present disclosure, an apparatus for enabling an inverter to switch between modes includes: a first inverter unit; a second inverter unit; a load connected between the first inverter unit and the second inverter unit; a mode switching unit connected between the load and the second inverter unit; and a control unit configured to drive the load in a one-stage inverter mode or a two-stage inverter mode by performing control that turns on or off the mode switching unit. In particular, when an inverter switches between modes, the control unit performs mode switching in accordance with correct mode switching timing synchronization for PWM signal output.

In one embodiment, the control unit may drive the load in the two-stage inverter mode by turning off the mode switching unit and may drive the load in the one-stage inverter mode by turning on the mode switching unit.

In another embodiment, the mode switching unit may include three switches $S_7$, $S_8$, and $S_9$ that are connected for phases U, V, and W, respectively. Input terminals of the three switches $S_7$, $S_8$, and $S_9$ may be respectively connected to lines for the phases U, V and W, and output terminals of the three switches $S_7$, $S_8$, and $S_9$ may be connected in a shared manner to each other.

In one embodiment, when performing the mode switching, the control unit may cause a time delay in a manner that corresponds to an interval of a dead time between a mode switching signal $S_{base}$ and a signal $S_{comp}$ for driving the second inverter unit in order to achieve timing synchronization.

In one embodiment, the dead time may be set in a manner that corresponds to a time when an amount of electric current falls to zero "0" according to a magnitude of electric current $i_{u,\,v,\,w}$ that flows immediately before the mode switching, and the dead time that varies according to the magnitude of the electric current $i_{u,\,v,\,w}$ that flows immediately before the mode switching may be preset in the form of a look-up table.

In one embodiment, the control unit may include: a first core CORE0 configured to compute a PWM signal for controlling the first inverter unit and the second inverter unit, to compute a mode switching signal $S_{base}$, to calculate a dead time, and to set the PWM signal, the mode switching signal $S_{base}$, and the dead time; and a second core CORE1 configured to output data with which a buffer is updated, in accordance with a designated inverter control period signal.

In one embodiment, when the mode switching is desired during inverter control, and a current inverter mode is the one-stage inverter mode, in order to switch to the two-stage inverter mode, the control unit may set a mode switching signal $S_{base}$ to zero "0" and may calculate a dead time on the basis of a magnitude of electric current $i_{u,\,v,\,w}$ that flows immediately before the mode switching. When the mode switching is desired during the inverter control, and the current inverter mode is the two-stage inverter mode, in order to switch to the one-stage inverter mode, the control unit may set the mode switching signal $S_{base}$ to "1" and may calculate the dead time on the basis of the magnitude of the electric current $i_{u,\,v,\,w}$ that flows immediately before the mode switching. The control unit may set new data that includes the calculated dead time, a PWM signal for controlling the first inverter unit and the second inverter unit, and the mode switching signal $S_{base}$ and may update a buffer with the resulting new data.

In one embodiment, when the mode switching is not necessary during the inverter control, the control unit may maintain data previously stored in the buffer, without any change.

In another embodiment, when a current inverter control mode is a single sampling mode and a counter variable ControlRateCnt that is a variable for counting a half of a control period is zero "0" representing the former half of one control period, the control unit may set previous data without any change, may update a buffer with the resulting previous data, and, in order to designate the latter half of the one control period, may increase the counter variable ControlRateCnt.

In another embodiment, when a current inverter control mode is a single sampling mode, a counter variable ControlRateCnt is "1" representing the latter half of one control period instead of zero "0", and new data are computed and set. The control unit may set the computed new data, may update a buffer with the resulting computed new data, and then, in order to designate the former half of the one control period, may set the counter variable ControlRateCnt to zero "0".

In one embodiment, when a current inverter control mode is a single sampling mode, a counter variable ControlRateCnt is "1" representing the latter half of one control period instead of zero "0", and new data are neither computed nor set, the control unit may determine that data computation is not finished within the one control period and is delayed to the next control period. The control unit may set previous data without any change, may update a buffer with the resulting previous data, and then, in order to designate the former half of the one control period, may set the counter variable ControlRateCnt to zero "0".

In one embodiment, when a current inverter control mode is a double sampling mode instead of a single sampling mode and new data are computed and set, the control unit may set the computed new data and may update a buffer with the resulting computed new data. Then, when a counter variable ControlRateCnt is zero "0" representing the former half of one control period, the control unit may increase the counter variable ControlRateCnt in order to designate the latter half of the one control period. When the counter variable ControlRateCnt is "1" representing the latter half of the one control period instead of zero "0", the control unit may set the counter variable ControlRateCnt to zero "0" in order to designate the former half of the one control period.

In another embodiment, when a current inverter control mode is a double sampling mode instead of a single sampling mode and new data are neither computed nor set, the control unit may set previous data without any change and may update a buffer with the resulting previous data. Then, when a counter variable ControlRateCnt is zero "0" representing the former half of one control period, the control unit may increase the counter variable ControlRateCnt in order to designate the latter half of the one control period. When the counter variable ControlRateCnt is "1" representing the latter half of the one control period instead of zero "0", the control unit may set the counter variable ControlRateCnt to zero "0" in order to designate the former half of the one control period.

According to another aspect of the present disclosure, there is provided a method of controlling an apparatus for enabling an inverter to switch between modes. In particular, the method includes: setting, by a control unit, a mode switching signal $S_{base}$ to zero "0"; and calculating, by the control unit, a dead time based on a magnitude of electric current $i_{u, v, w}$ that flows immediately before mode switching, in order to switch to a two-stage inverter mode, when a current inverter mode is a one-stage inverter mode, in a case where mode switching is desired during inverter control. The method further includes: setting, by the control unit, the mode switching signal $S_{base}$ to 1; and calculating, by the control unit, the dead time based on the magnitude of the electric current $i_{u, v, w}$ that flows immediately before the mode switching, in order to switch to a one-stage inverter mode, when the current inverter mode is a two-stage inverter mode, in the case where the mode switching is desired during the inverter control. The method further includes: setting, by the control unit, new data including the dead time, a PWM signal for controlling a first inverter unit and a second inverter unit, and the mode switching signal $S_{base}$; and updating, by the control unit, a buffer with the resulting new data.

In one embodiment, when a current inverter control mode is a single sampling mode and a counter variable ControlRateCnt that is a variable for counting a half of a control period is zero "0" representing the former half of one control period, the control unit may set previous data without any change, and may update the buffer with the resulting previous data. In order to designate the latter half of the one control period, the control unit may increase the counter variable ControlRateCnt.

In one embodiment, when a current inverter control mode is a single sampling mode, a counter variable ControlRateCnt is 1 representing the latter half of one control period instead of zero "0", and new data are computed and set. The control unit may set the computed new data, may update the buffer with the resulting computed new data, and then, in order to designate the former half of the one control period, may set the counter variable ControlRateCnt to zero "0".

In one embodiment, when a current inverter control mode is a single sampling mode, a counter variable ControlRateCnt is 1 representing the latter half of one control period instead of 0, and new data are neither computed nor set, the control unit may determine that data computation is not finished within the one control period and is delayed to the next control period. The control unit may set previous data without any change, may update the buffer with the resulting previous data, and then, in order to designate the former half of the one control period, may set the counter variable ControlRateCnt to zero "0".

In one embodiment, when a current inverter control mode is a double sampling mode instead of a single sampling mode and new data are computed and set, the control unit may set the computed new data and may update the buffer with the resulting computed new data. Then, when a counter variable ControlRateCnt is zero "0" representing the former half of one control period, the control unit may increase the counter variable ControlRateCnt in order to designate the latter half of the one control period. When the counter variable ControlRateCnt is 1 representing the latter half of the one control period instead of zero "0", the control unit may set the counter variable ControlRateCnt to zero "0" in order to designate the former half of the one control period.

In one embodiment, when a current inverter control mode is a double sampling mode instead of a single sampling mode and new data are neither computed nor set, the control unit may set previous data without any change and may update the buffer with the resulting previous data. Then, when a counter variable ControlRateCnt is zero "0" representing the former half of one control period, the control unit may increase the counter variable ControlRateCnt in order to designate the latter half of the one control period. When the counter variable ControlRateCnt is 1 representing the latter half of the one control period instead of zero "0", the control unit may set the counter variable ControlRateCnt to zero "0" in order to designate the former half of the one control period.

According to the present disclosure, the apparatus for enabling an inverter to switch between modes and the method of controlling the apparatus can improve the safety when the two-stage inverter switches between modes.

BRIEF DESCRIPTION OF THE DRAWINGS

In order that the disclosure may be well understood, there will now be described various forms thereof, given by way of example, reference being made to the accompanying drawings, in which:

FIG. 6 is a block diagram illustrating the single sampling mode operation in FIG. 5 that is performed when data computation is not finished during one control period and is delayed to the next control period; and.

The drawings described herein are for illustration purposes only and are not intended to limit the scope of the present disclosure in any way.

DETAILED DESCRIPTION

An apparatus for enabling an inverter to switch between modes and a method of controlling the apparatus according to first and second embodiments, respectively, of the present disclosure are described below with reference to the accompanying drawings.

For clarity and convenience in description, thicknesses of lines and sizes of constituent elements may be illustrated in non-exact proportion in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

When a component, device, element, or the like of the present disclosure is described as having a purpose or performing an operation, function, or the like, the component, device, or element should be considered herein as being "configured to" meet that purpose or to perform that operation or function.

Also, the terms, such as 'unit' or 'module', etc., should be understood as a unit that processes at least one function or operation and that may be embodied in a hardware manner (e.g., a processor), a software manner, or a combination of the hardware manner and the software manner.

Figure 1:
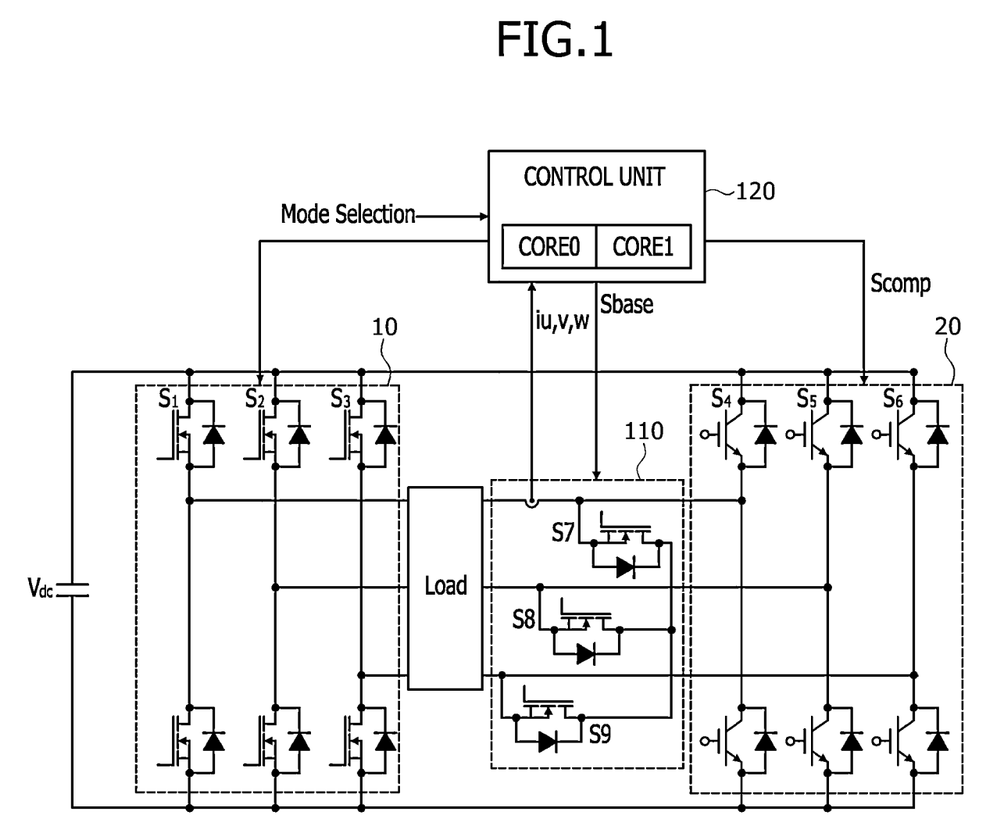
FIG. 1 is a view illustrating a schematic configuration of an apparatus for enabling an inverter to switch between modes according to a first embodiment of the present disclosure.

FIG. 1 is a view illustrating a schematic configuration of the apparatus for enabling an inverter to switch between modes according to the first embodiment of the present disclosure.

As illustrated in FIG. 1, the apparatus for enabling an inverter to switch between modes according to the first embodiment includes a first inverter unit 10, a second inverter unit 20, a mode switching unit 110 formed between the first inverter unit 10 and the second inverter unit 20, and a control unit 120.

A load (for example, a motor) is connected between the first inverter unit 10 and the mode switching unit 110. A power source $V_{dc}$ is connected to the first inverter unit 10.

Under the control of the control unit 120, the first inverter unit 10 may apply a step voltage (for example, a six-step voltage) to the load. Under the control of the control unit 120, the mode switching unit 110 may be turned on and off. Thus, the load may be driven in a one-stage inverter mode or a two-stage inverter mode.

For example, under the control of the control unit 120, the load is driven in the two-stage inverter mode (i.e., in a high-output mode) in a case where the mode switching unit 110 is turned off, and the load is driven in the one-stage inverter mode (i.e., in a high-efficiency mode) in a case where the mode switching unit 110 is turned on.

The mode switching unit 110 includes three switches $S_7$, $S_8$, and $S_9$ that are connected for phases U, V, and W, respectively, and input terminals of the three switches $S_7$, $S_8$, and $S_9$ are connected to lines, respectively, for the phases U, V, and W, and output terminals thereof are connected in a shared manner to each other.

When the control unit 120 drives the load in the one-stage inverter mode, the control unit 120 may select any one of a plurality of inverter driving techniques (Space Vector Pulse Width Modulation (SVPWM) and Discontinuous Pulse Width Modulation (DPWM) techniques) according to a pre-designated condition (for example, a temperature or a modulation index M.I) and may drive the load.

In addition, when the control unit 120 drives the load in the two-stage inverter mode, the control unit 120 may select any one of the plurality of inverter driving techniques (SVPWM and DPWM techniques) according to the pre-designated condition (for example, temperature or a modulation index M.I) and may drive the load.

For reference, in the SVPWM technique, inverter six-phase switching is performed at a PWM carrier frequency, and inverter four-phase switching is performed at the PWM carrier frequency. Therefore, at the same carrier frequency, the number of switching phases is smaller in the DPWM technique than in the SVPWM technique. For this reason, switching loss is accordingly low. The lower the switching loss, the lower loss of heat of a switching element. Thus, the switching element is less heated.

When a high motor output is not necessary, the control unit 120 may increase efficiency through control in the one-stage inverter mode (i.e., high-efficiency driving). In other words, the high-efficiency driving may be performed through control that drives only the first inverter unit 10.

In addition, when a high motor output is desired, the control unit 120 may increase an output through control in the two-stage inverter mode (that is, high-output driving). In other words, the high-output driving may be performed through control that drives both the first inverter unit 10 and the second inverter unit 20.

The driving of the load in the two-stage inverter mode through turn-off control of the mode switching unit 110 by the control unit 120 means that the control unit 120 performs the high-output driving through an open-end winding technique. Moreover, the driving of the load in the one-stage inverter mode through turn-on control of the mode switching unit 110 by the control unit 120 means that the control unit 120 performs the high-efficiency driving through a three-phase technique.

A rated operating temperature of a switching element (SiC MOSFET) (which may be hereinafter described as a first switching element) that is used in the first inverter unit 10 ranges from −55 to 175 degrees (° C.). A rated operating temperature of a switching element (Si IGBT) (which may be hereinafter described as a second switching element) that is used in the second inverter unit 20 ranges from −40 to 175 degrees (° C.).

In this case, a temperature of each switching element may be measured using its own built-in temperature sensor (not illustrated). The temperature of the switching element that does not have its built-in temperature sensor may be measured using an external separate temperature sensor (not illustrated) connected thereto.

For reference, the SiC MOSFET is suitable for low rated electric power and thus cannot be used for high output. In contrast, the Si IGBT is suitable for high output, but cannot achieve high efficiency. Therefore, each switching element of the first inverter unit 10 may be realized as the SiC MOSFET, and each switching element of the second inverter unit 20 may be realized as the Si IGBT.

In addition, in the one-stage inverter mode, a battery voltage cannot be sufficiently used and therefore, usually, is used only up to a linear modulation region (a modulation index M.I of 1.15). In the two-stage inverter mode, a maximum magnitude of a phase voltage that can be output is a magnitude of a voltage of the power source $V_{dc}$, and the battery voltage can be sufficiently used. Therefore, the two-stage inverter mode, rather than the one-stage inverter mode, is available for high output. However, a larger number of switches are used in the two-stage inverter mode than in the one-stage inverter mode. Accordingly, the two-stage inverter mode has the characteristic that its power conversion efficiency is decreased due to increases in switching loss and electric conduction loss.

The control unit 120 may be an ECU (Electronic Control Unit) or MCU (Micro Controller Unit) of a vehicle.

Figure 2:
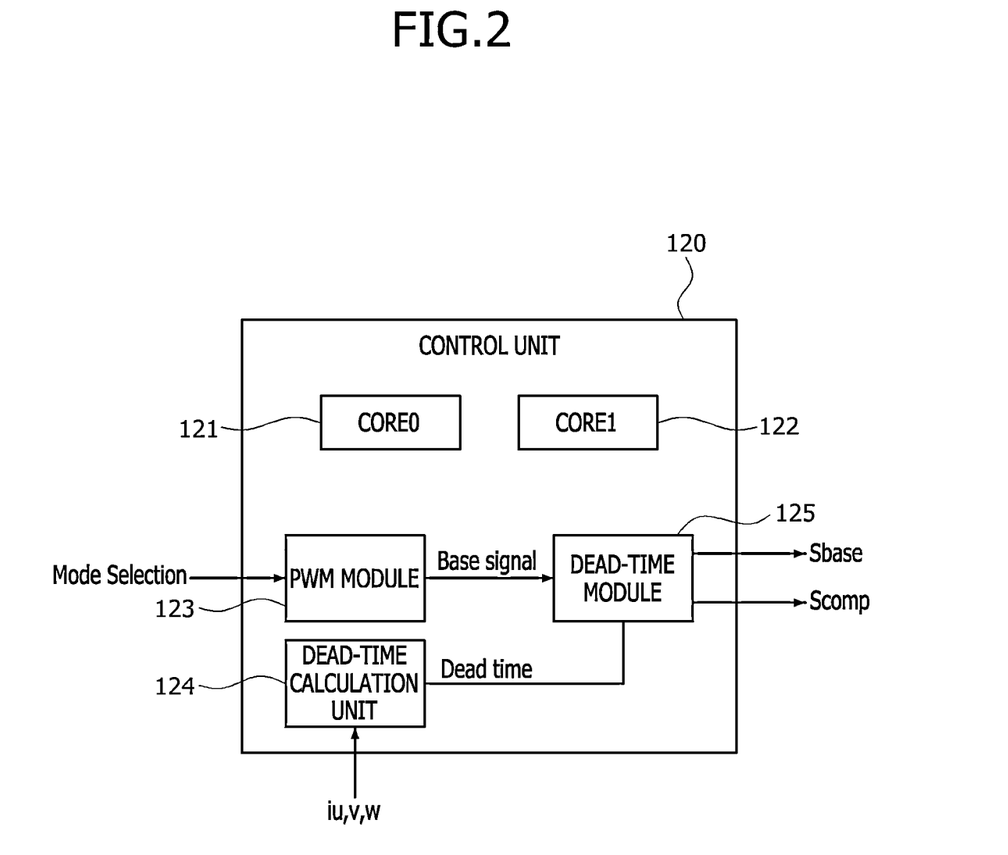
FIG. 2 is a block diagram illustrating a more detailed configuration of a control unit in FIG. 1.

FIG. 2 is a block diagram illustrating a more detailed configuration of the control unit 120 in FIG. 1. As illustrated, the control unit 120 includes a plurality of cores, that is, cores CORE0 and CORE1 121 and 122, a PWM module 123, a dead-time calculation unit 124, and a dead-time module 125.

The first core CORE0 121 performs computation of a signal (PWM signal) for controlling the first inverter unit 10 and the second inverter unit 20, computation of a mode switching signal $S_{base}$, and calculation of a dead time. The first core CORE0 121 sets the PWM signal for controlling the first inverter unit 10 and the second inverter unit 20, the mode switching signal $S_{base}$, and the dead time, and updates a buffer (not illustrated) with the resulting PWM signal, mode switching signal $S_{base}$, and dead time.

The second core CORE1 122 outputs data (for example, the PWM signal for controlling the first inverter unit 10 and the second inverter unit 20, the mode switching signal $S_{base}$, and the dead time) with which the buffer (not illustrated) is updated, in accordance with a designated inverter control period signal (not illustrated).

The PWM module 123 outputs a signal (base signal) for switching to the one-stage inverter mode or the two-stage inverter mode, according to a mode selection signal.

The dead-time calculation unit 124 calculates the dead time on the basis of electric current $i_{u, v, w}$ that flows immediately before mode switching.

The time taken for the dead time to be reduced to zero "0" varies according to a magnitude of the electric current $i_{u, v, w}$ that flows immediately before the mode switching. Therefore, the dead time corresponding to the time taken for the amount of electric current to fall to zero "0" may be set in the form of a look-up table. For example, the greater the magnitude of the electric current $i_{u, v, w}$ that flows immediately before the mode switching, the longer the dead time, and the smaller the magnitude of the electric current $i_{u, v, w}$ that flows immediately before the mode switching, the shorter the dead time.

The dead-time module 125 provides a delay time between a signal $S_{base}$ for performing control that turns on/off the mode switching unit 110, and a signal $S_{comp}$ for driving the second inverter unit 20, as the dead time.

The constituent elements 121 to 125 that are described with reference to FIG. 2 serve to help understand operation of the control unit 120, and the control unit 120 is not limited to the constituent elements 121 to 125.

When the two-stage inverter switches between modes, and when a section occurs in which the mode switching signal $S_{base}$ and the signal $S_{comp}$ for driving the second inverter unit 20 are applied at the same time, the load (for example, a motor) instantaneously has Y-connection and open wind structures at the same time, thereby being short-circuited. Thus, the safety is not ensured when the two-stage inverter switches between the modes.

Therefore, a sufficient delay time for ensuring the safety when the inverter switches between the modes has to be provided in order to prevent the above-mentioned problem. In other words, the problem occurs when the load is short-circuited in the case where the section occurs in which the mode switching signal $S_{base}$ and the signal $S_{comp}$ for driving the second inverter unit 20 are applied at the same time, when the two-stage inverter switches between the modes. However, when an interruption (for example, a software interruption, such as an unintended increase in the time taken to compute the PWM signal) occurs when the inverter switches between the modes, the delay time is increased. Accordingly, the load (for example, the motor) cannot be controlled for a time that corresponds to the increased delay time. Thus, there may occur a problem in that the safety is decreased. In other words, there may occur a problem in that it is difficult to achieve correct mode switching timing synchronization for a motor control PWM output.

In order to solve this problem, the mode switching method according to the first embodiment of the present disclosure is provided. The method is capable of achieving the correct mode switching timing synchronization for the motor control PWM output although the unintended interruption (e.g., the software interruption, such as a delay in computing the PWM signal) occurs when the two-stage inverter switches between the modes.

Figure 3:
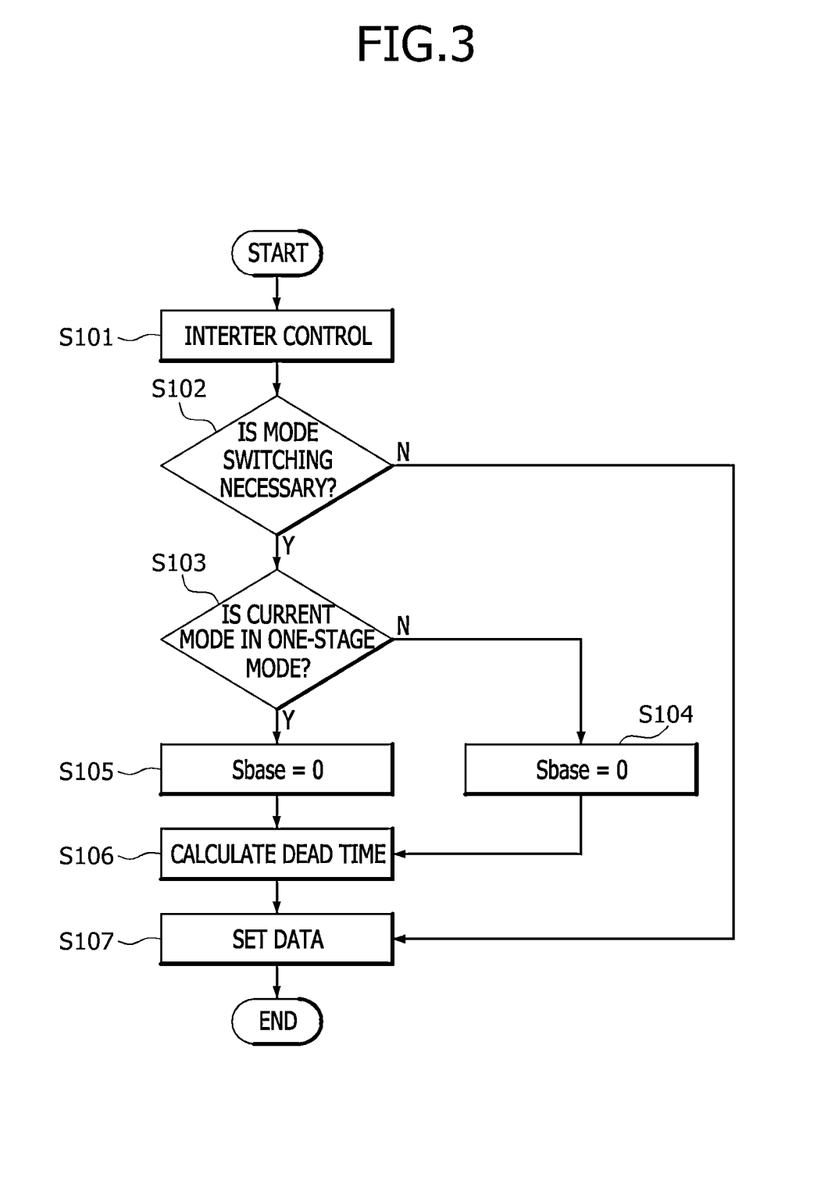
FIGS. 3 and 4 are flowcharts illustrating a method of controlling an apparatus for enabling an inverter to switch between modes according to a second embodiment of the present disclosure.
Figure 4:
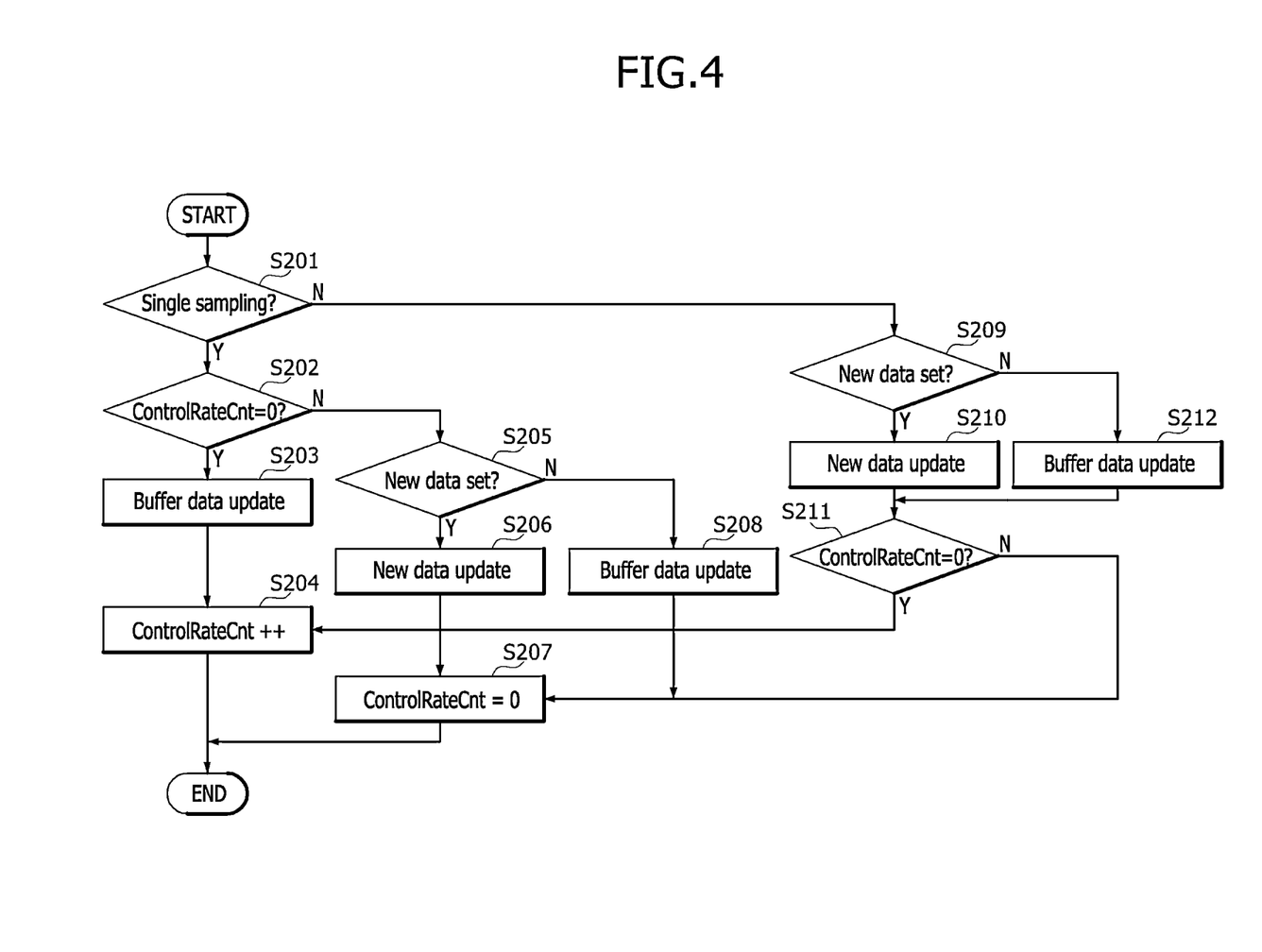

FIGS. 3 and 4 are flowcharts illustrating the method of controlling the apparatus for enabling an inverter to switch between modes according to the second embodiment of the present disclosure.

With reference to FIG. 3, during inverter control (S101), when the mode switching is desired (Y in S102), and when a current inverter mode is a one-stage mode (i.e., the one-stage inverter mode) (Y in S103), in order to switch to the two-stage inverter mode, the control unit 120 sets the mode switching signal $S_{base}$ to zero "0" (S105) and calculates the dead time on the basis of the magnitude of the electric current $i_{u, v, w}$ that flows immediately before the mode switching (S106).

When the current inverter mode is not the one-stage mode (i.e., the one-stage inverter mode) (N in S103) (i.e., when the current inverter mode is a two-stage mode), in order to switch to the one-stage inverter mode, the control unit 120 sets the mode switching signal $S_{base}$ to 1 (S104) and calculates the dead time on the basis of the magnitude of the electric current $i_{u, v, w}$ that flows immediately before the mode switching (S106).

The dead time that varies according to the magnitude of the electric current $i_{u, v, w}$ that flows immediately before the mode switching may be preset in the form of a look-up table.

When the mode switching signal $S_{base}$ and the dead time are calculated, the control unit 120 sets the calculated data (for example, the PWM signal for controlling the first inverter unit 10 and the second inverter unit 20, the mode switching signal $S_{base}$, and the dead time) (i.e., new data) and updates the buffer (not illustrated) with the resulting calculated data (S107).

During the inverter control (S101), when the mode switching is not necessary (N in S102), the control unit 120 sets the previous data (for example, the PWM signal for controlling the first inverter unit 10 and the second inverter unit 20, the mode switching signal $S_{base}$, and the dead time) without any change and updates the buffer with the resulting previous data (or maintains without any change the data previously stored in the buffer (S107).

With reference to FIG. 4, when a current inverter control mode is a single sampling mode (Y in S201) and a counter variable ControlRateCnt (a variable for counting a half of a control period) is zero "0" (i.e., the former half of one control period) (Y in S202), the control unit 120 sets the previous data (for example, the PWM signal for controlling the first inverter unit 10 and the second inverter unit 20, the mode switching signal $S_{base}$, and the dead time) without any change and updates the buffer with the resulting previous data (S203). Moreover, the control unit 120 increases the counter variable ControlRateCnt in order to designate the latter half of the one control period (S204).

When the current inverter control mode is the single sampling mode (Y in S201) and the counter variable ControlRateCnt is not 0 (i.e., the counter variable ControlRateCnt is 1 representing the latter half of one control period) (N in S202), if new data (for example, the PWM signal for controlling the first inverter unit 10 and the second inverter unit 20, the mode switching signal $S_{base}$, and the dead time) are computed and set (Y in S205), the control unit 120 sets the computed new data and updates the buffer with the resulting computed new data (S206), and then sets the counter variable ControlRateCnt to 0 in order to designate the former half of the one control period (S207).

When the current inverter control mode is the single sampling mode (Y in S201) and the counter variable ControlRateCnt is not 0 (i.e., the counter variable ControlRateCnt is 1 representing the latter half of one control period) (N in S202), if new data (for example, the PWM signal for controlling the first inverter unit 10 and the second inverter unit 20, the mode switching signal $S_{base}$, and the dead time) are neither computed nor set (N in S205) (that is, if data computation is not finished within the one control period and is delayed to the next control period), the control unit 120 sets the previous data (for example, the PWM signal for controlling the first inverter unit 10 and the second inverter unit 20, the mode switching signal $S_{base}$, and the dead time) without any change and updates the buffer with the resulting previous data (S208) and then sets the counter variable ControlRateCnt to zero "0" in order to designate the former half of the one control period (S207).

When the current inverter control mode is not the single sampling mode (N in S201) (i.e., the current inverter control mode is a double sampling mode), if new data (for example, the PWM signal for controlling the first inverter unit 10 and the second inverter unit 20, the mode switching signal $S_{base}$, and the dead time) are computed and set (Y in S209), the control unit 120 sets the computed new data and updates the buffer with the resulting new data (S210). Then, when the counter variable ControlRateCnt is 0 (Y in S211) (i.e., 0 representing the former half of the one control period), the control unit 120 increases the counter variable ControlRateCnt in order to designate the latter half of the one control period (S204). Moreover, when the counter variable ControlRateCnt is not 0 (N in S211) (i.e., the counter variable ControlRateCnt is 1 representing the latter half of the one control period), the control unit 120 sets the counter variable ControlRateCnt to 0 in order to designate the former half of the one control period (S207).

When the current inverter control mode is not the single sampling mode (N in S201) (i.e., the current inverter control mode is the double sampling mode), if new data are neither computed nor set (N in S209), the control unit 120 sets the previous data (for example, the PWM signal for controlling the first inverter unit 10 and the second inverter unit 20, the mode switching signal $S_{base}$, and the dead time) without any change and updates the buffer with the resulting previous data (S212). Then, when the counter variable ControlRateCnt is zero "0" (Y in S211) (i.e., 0 representing the former half of the one control period), the control unit 120 increases the counter variable ControlRateCnt in order to designate the latter half of the one control period (S204). Moreover, when the counter variable ControlRateCnt is not 0 (N in S211) (i.e., the counter variable ControlRateCnt is 1 representing the latter half of the one control period), the control unit 120 sets the counter variable ControlRateCnt to 0 in order to designate the former half of the one control period (S207).

Figure 5:
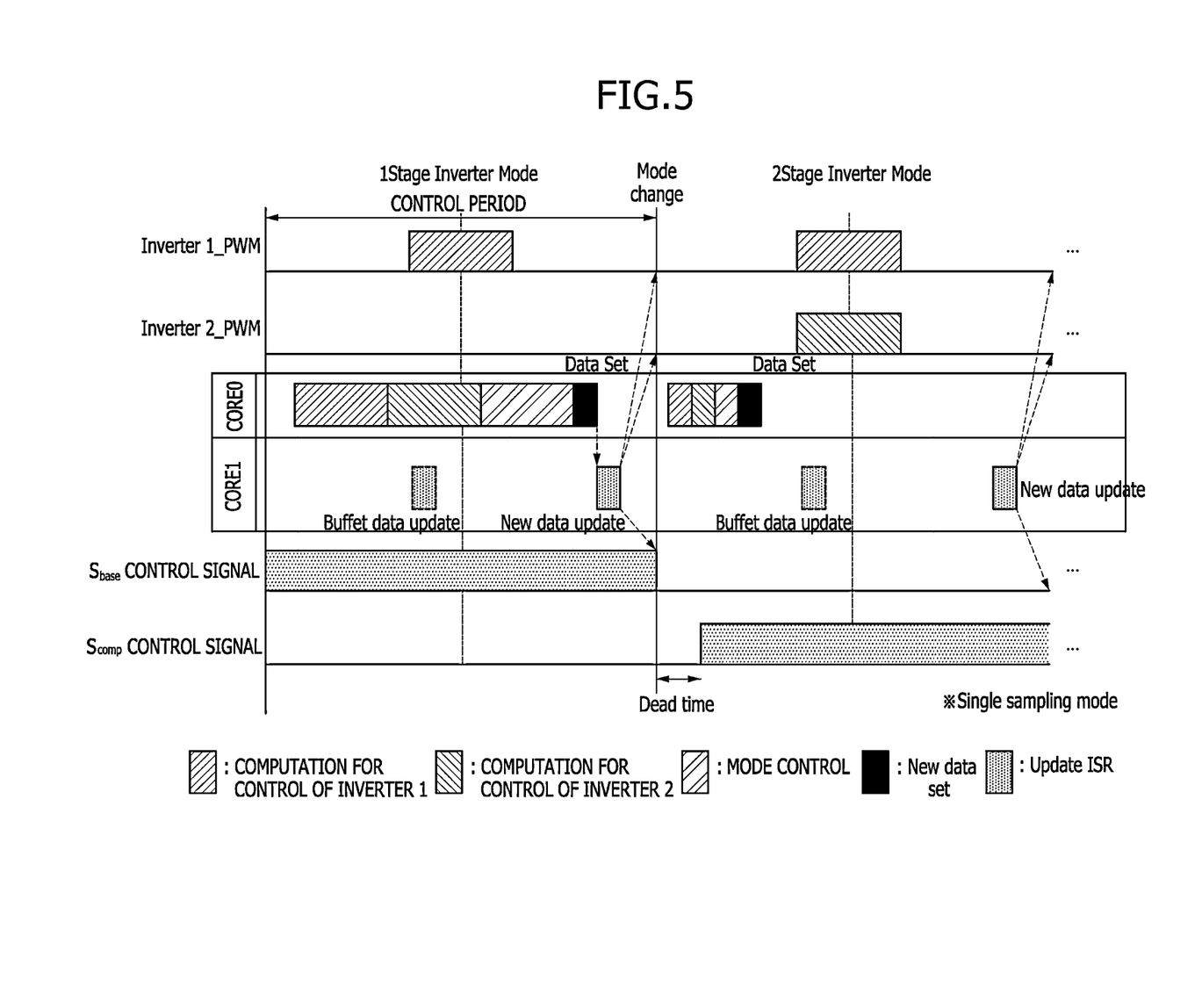
FIG. 5 is a block diagram illustrating a single sampling mode operation in FIG. 4 in which data computation and inverter mode switching may occur during one control period.

FIG. 5 is a block diagram illustrating a single sampling mode operation in FIG. 4 in which data computation and inverter mode switching may occur during one control period. With reference to FIG. 5, the first core CORE0 computes and sets new data (for example, the PWM signal for controlling the first inverter unit 10 and the second inverter unit 20, the mode switching signal $S_{base}$, and the dead time) during one control period and updates the buffer (not illustrated) with the resulting new data. Moreover, when the buffer is updated with the new data, the second core CORE1 outputs the new data (for example, the PWM signal for controlling the first inverter unit 10 and the second inverter unit 20, the mode switching signal $S_{base}$, and the dead time) with which the buffer (not illustrated) is updated, in accordance with the designated inverter control period signal (not illustrated).

At this point, after a state of the mode switching signal $S_{base}$ is changed (for example, 1→0), when the dead time elapses, the control unit 120 outputs the signal $S_{comp}$ for driving the second inverter unit 20.

In the single sampling mode, although the first core CORE0 computes new data (for example, the PWM signal for controlling the first inverter unit 10 and the second inverter unit 20, the mode switching signal $S_{base}$, and the dead time) within a half of the control period, the first core CORE0 updates the buffer (not illustrated) with the computed new data during the next half of the control period. Thus, the second core CORE1 outputs the new data with which the buffer (not illustrated) is updated, in accordance with the designated inverter control period signal (not illustrated).

Figure 6:
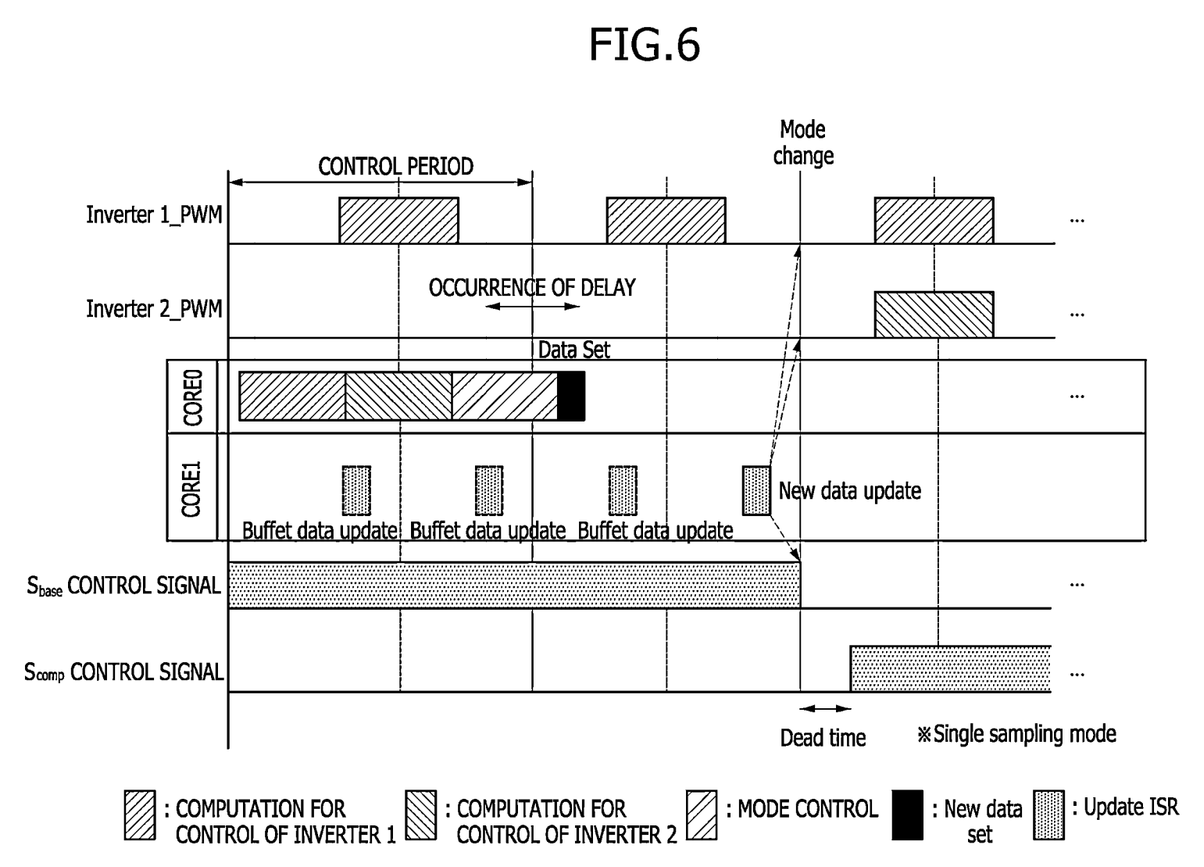

FIG. 6 is a block diagram illustrating the single sampling mode operation in FIG. 5 that is performed in a case where the data computation is not finished during one control period and is delayed to the next control period. As illustrated, in the single sampling mode, in a case where the first core CORE0 does not finish computation of new data within one control period and, after delay, finishes the computation during the next control period, the first core CORE0 updates the buffer (not illustrated) with the computed new data during the next control period. Thus, the second core CORE1 outputs the new data with which the buffer (not illustrated) is updated, in accordance with the designated inverter control period signal (not illustrated).

According to the second embodiment, although a delay occurs in the data computation in the signal sampling mode, the correct mode switching timing synchronization for the motor control PWM output can be achieved.

Figure 7:
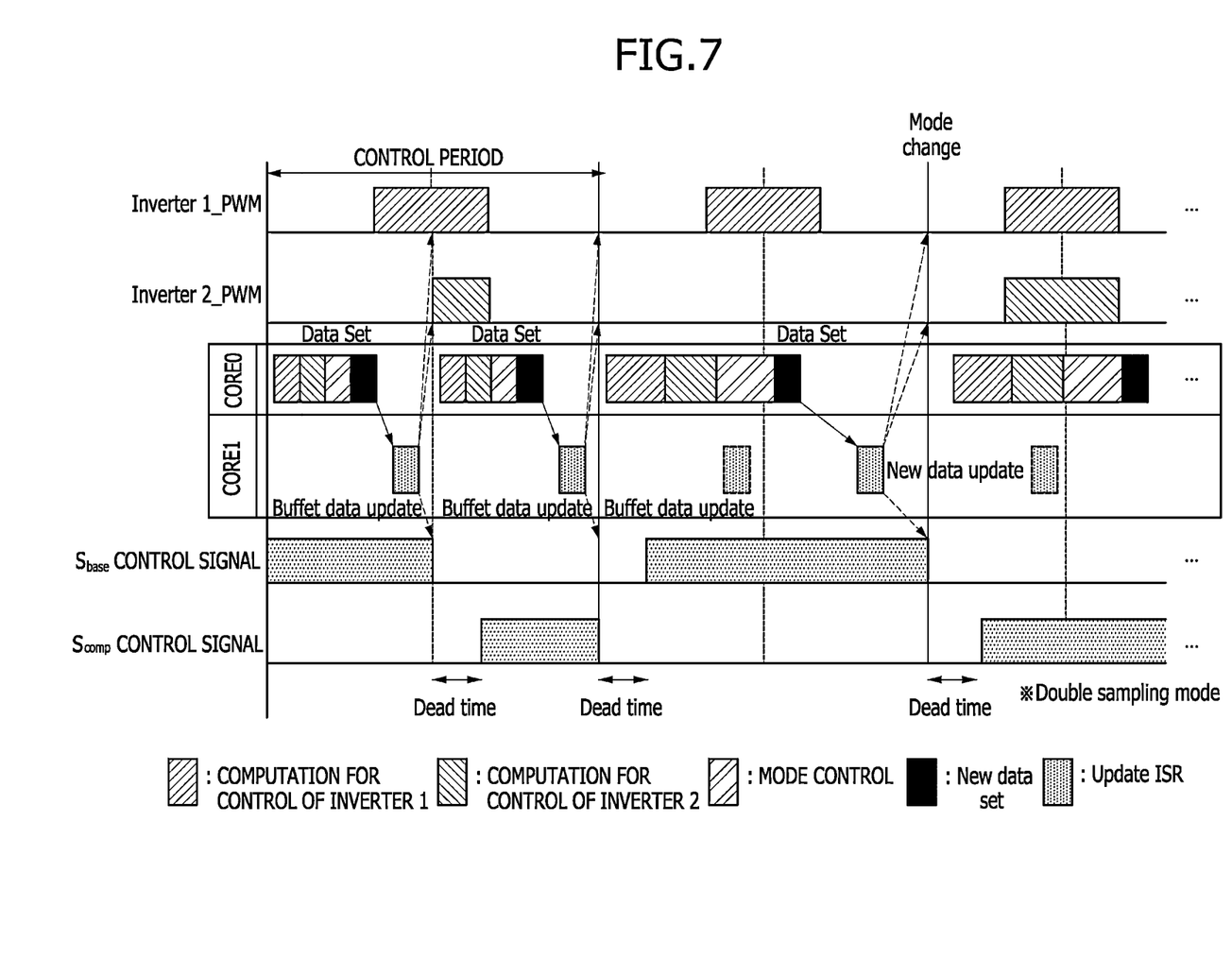
FIG. 7 is a block diagram illustrating a double sampling mode operation in FIG. 4 in which the data computation and the inverter mode switching may occur during a half of the control period.

FIG. 7 is a block diagram illustrating a double sampling mode operation in FIG. 4 in which the data computation and the inverter mode switching may occur during a half of the control period. The first core CORE0 computes and sets new data (for example, the PWM signal for controlling the first inverter unit 10 and the second inverter unit 20, the mode switching signal $S_{base}$, and the dead time) during a half of the control period and updates the buffer (not illustrated) with the resulting new data. When the buffer is updated with the resulting new data, the second core CORE1 outputs the new data (for example, the PWM signal for controlling the first inverter unit 10 and the second inverter unit 20, the mode switching signal $S_{base}$, and the dead time) with which the buffer (not illustrated) is updated, in accordance with the designated inverter control period signal (not illustrated).

After the state of the mode switching signal $S_{base}$ is changed (for example: 1→0), when the dead time elapses, the control unit 120 outputs the signal $S_{comp}$ for driving the second inverter unit 20.

In the double sample mode, when the first core (CORE0) does not finish computation of new data (for example, the PWM signal for controlling the first inverter unit 10 and the second inverter unit 20, the mode switching signal $S_{base}$, and the dead time) within a half of the control period and, after delay, finishes the computation during the next half of the control period, the first core CORE0 updates the buffer (not illustrated) with the computed new data during the next half of the control period. Thus, the second core CORE1 outputs the new data with which the buffer (not illustrated) is updated, in accordance with the designated inverter control period signal (not illustrated).

According to the present embodiment, although the delay occurs in the data computation in the double sampling mode, the correct mode switching timing synchronization for the motor control PWM output can be achieved.

The mode switching method according to the second embodiment is provided as described above. The method is capable of achieving the correct mode switching timing synchronization for the motor control PWM output although the unintended interruption (the software interruption, such as a delay in computing the PWM signal) when the two-stage inverter switches between the modes occurs.

The embodiments of the present disclosure are described only in an exemplary manner, with reference to the drawings. It would be understandable to a person of ordinary skill in the art to which the present disclosure pertains that various other modifications and equivalents are possible from this description. Thus, the technical scope of the present disclosure should be defined by the following claims. In addition, the features described in the present specification, for example, may be realized in the form of a method, a process, an apparatus, a software program, a data stream, or a signal. The features, although described in context of a single form (for example, described as only in the form of a method) may also be realized in a different form (for example, in the form of an apparatus or a program). The apparatus may be realized in the form of adequate hardware, software, firmware, or the like. The method, for example, may be realized in an apparatus, such as a computer, a microprocessor, or a processor that generally refers to a processing device, such as an integrated circuit or a programmable logic device.

What is claimed is:

1. An apparatus for enabling an inverter to switch between modes, the apparatus comprising:
    a first inverter unit;
    a second inverter unit;
    a load connected between the first inverter unit and the second inverter unit;
    a mode switching unit connected between the load and the second inverter unit; and
    a control unit configured to drive the load in a one-stage inverter mode or a two-stage inverter mode by performing control that turns on or off the mode switching unit,
    wherein, when an inverter switches between modes, the control unit performs mode switching based on a dead time between a mode switching signal and a signal for driving the second inverter unit, in accordance with correct mode switching timing synchronization for PWM signal output.

2. The apparatus of claim 1, wherein the control unit is configured to drive the load in the two-stage inverter mode by turning off the mode switching unit and drive the load driving in the one-stage inverter mode by turning on the mode switching unit.

3. The apparatus of claim 1, wherein the mode switching unit includes three switches that are connected for phases U, V, and W, respectively, and
    wherein input terminals of the three switches are connected to lines, respectively, for the phases U, V, and W, and output terminals thereof are connected in a shared manner to each other.

4. The apparatus of claim 1, wherein when performing the mode switching, the control unit is configured to cause a time delay that corresponds to an interval of the dead time in order to achieve timing synchronization.

5. The apparatus of claim 4, wherein the dead time is set to correspond to a time when an amount of electric current falls to zero "0" based on a magnitude of electric current that flows immediately before the mode switching, and
    wherein the dead time that varies based on the magnitude of the electric current that flows immediately before the mode switching is preset in form of a look-up table.

6. The apparatus of claim 1, wherein the control unit comprises:
    a first core configured to:
        compute a PWM signal for controlling the first inverter unit and the second inverter unit,
        compute a mode switching signal,
        calculate the dead time, and
        set the PWM signal, the mode switching signal, and the dead time; and a second core configured to output data with which a buffer is updated based on a designated inverter control period signal.

7. The apparatus of claim 1, wherein, when the mode switching is desired during inverter control, and when a current inverter mode is the one-stage inverter mode, in order to switch to the two-stage inverter mode, the control unit is configured to set a mode switching signal to zero "0" and calculate the dead time based on a magnitude of electric current that flows immediately before the mode switching,
wherein, when the mode switching is desired during the inverter control, and when the current inverter mode is the two-stage inverter mode, in order to switch to the one-stage inverter mode, the control unit is configured to set the mode switching signal to 1 and calculate the dead time based on the magnitude of the electric current that flows immediately before the mode switching, and
wherein the control unit is configured to set new data that includes the calculated dead time, a PWM signal for controlling the first inverter unit and the second inverter unit, and the mode switching signal, the control unit configured to update a buffer with the resulting new data.

8. The apparatus of claim 7, wherein, when the mode switching is not necessary during the inverter control, the control unit is configured to maintain data previously stored in the buffer, without any change.

9. The apparatus of claim 1, wherein, when a current inverter control mode is a single sampling mode and a counter variable that is a variable for counting a half of a control period is zero "0" representing a former half of one control period, the control unit is configured to:
set previous data without any change,
update a buffer with the resulting previous data, and
increase the counter variable to designate a latter half of the one control period.

10. The apparatus of claim 1, wherein, when a current inverter control mode is a single sampling mode, a counter variable is 1 representing a latter half of one control period instead of zero "0", and new data are computed and set, the control unit is configured to:
set the computed new data,
update a buffer with the resulting computed new data, and
set the counter variable to zero "0" to designate a former half of the one control period.

11. The apparatus of claim 1, wherein, when a current inverter control mode is a single sampling mode, a counter variable is 1 representing a latter half of one control period instead of zero "0", and new data are neither computed nor set, the control unit is configured to:
determine that data computation is not finished within the one control period and is delayed to the next control period,
set previous data without any change,
update a buffer with the resulting previous data, and
set the counter variable to zero "0" to designate a former half of the one control period.

12. The apparatus of claim 1, wherein, when a current inverter control mode is a double sampling mode instead of a single sampling mode and new data are computed and set, the control unit is configured to:
set the computed new data and update a buffer with the resulting computed new data,
wherein, when a counter variable is zero "0" representing a former half of one control period, the control unit is configured to increase the counter variable to designate a latter half of the one control period, and
wherein, when the counter variable ControlRateCnt is 1 representing the latter half of the one control period instead of zero "0", the control unit is configured to set the counter variable to zero "0" to designate the former half of the one control period.

13. The apparatus of claim 1, wherein, when a current inverter control mode is a double sampling mode instead of a single sampling mode and new data are neither computed nor set, the control unit is configured to set previous data without any change and update a buffer with the resulting previous data,
wherein, when a counter variable is zero "0" representing a former half of one control period, the control unit is configured to increase the counter variable to designate a latter half of the one control period, and
wherein when the counter variable is 1 representing the latter half of the one control period instead of zero "0", the control unit is configured to set the counter variable to zero "0" to designate the former half of the one control period.

14. A method of controlling an apparatus of enabling an inverter to switch between modes, the method comprising:
setting, by a control unit, a mode switching signal to zero "0" and calculating a dead time based on a magnitude of electric current that flows immediately before mode switching, in order to switch to a two-stage inverter mode, when a current inverter mode is a one-stage inverter mode, when mode switching is desired during inverter control;
setting, by the control unit, the mode switching signal to 1 and calculating the dead time based on the magnitude of the electric current that flows immediately before the mode switching, in order to switch to a one-stage inverter mode, when the current inverter mode is a two-stage inverter mode, and when the mode switching is desired during the inverter control; and
setting, by the control unit, new data including the dead time, a PWM signal for controlling a first inverter unit and a second inverter unit, and the mode switching signal, and updating a buffer with the resulting new data.

15. The method of claim 14, wherein, when a current inverter control mode is a single sampling mode and a counter variable that is a variable for counting a half of a control period is zero "0" representing a former half of one control period, the control unit sets previous data without any change, updates the buffer with the resulting previous data, and increases the counter variable to designate a latter half of the one control period.

16. The method of claim 14, wherein when a current inverter control mode is a single sampling mode, a counter variable is 1 representing a latter half of one control period instead of zero "0", and new data are computed and set, the control unit sets the computed new data, updates the buffer with the resulting computed new data, and then, sets the counter variable to zero "0" to designate a former half of the one control period.

17. The method of claim 14, wherein, when a current inverter control mode is a single sampling mode, a counter variable is 1 representing a latter half of one control period instead of zero "0", and new data are neither computed nor set, the control unit determines that data computation is not finished within the one control period and is delayed to the next control period, sets previous data without any change, updates the buffer with the resulting previous data, and then sets the counter variable to zero "0" to designate a former half of the one control period.

18. The method of claim 14, wherein, when a current inverter control mode is a double sampling mode instead of a single sampling mode and new data are computed and set, the control unit sets the computed new data and updates the buffer with the resulting computed new data, wherein, then, when a counter variable is zero "0" representing a former half of one control period, the control unit increases the counter variable to designate a latter half of the one control period, and wherein, when the counter variable is 1 representing the latter half of the one control period instead of zero "0", the control unit sets the counter variable to zero "0" to designate the former half of the one control period.

19. The method of claim 14, wherein, when a current inverter control mode is a double sampling mode instead of a single sampling mode and new data are neither computed nor set, the control unit sets previous data without any change and updates the buffer with the resulting previous data, wherein, then, when a counter variable is zero "0" representing a former half of one control period, the control unit increases the counter variable to designate a latter half of the one control period, and wherein, when the counter variable is 1 representing the latter half of the one control period instead of zero "0", the control unit sets the counter variable to zero "0" to designate the former half of the one control period.

* * * * *